Jan. 2, 1945.  E. S. RUSSEY  2,366,655
AUTOMATIC INTERLOCK
Filed July 19, 1941  2 Sheets-Sheet 1
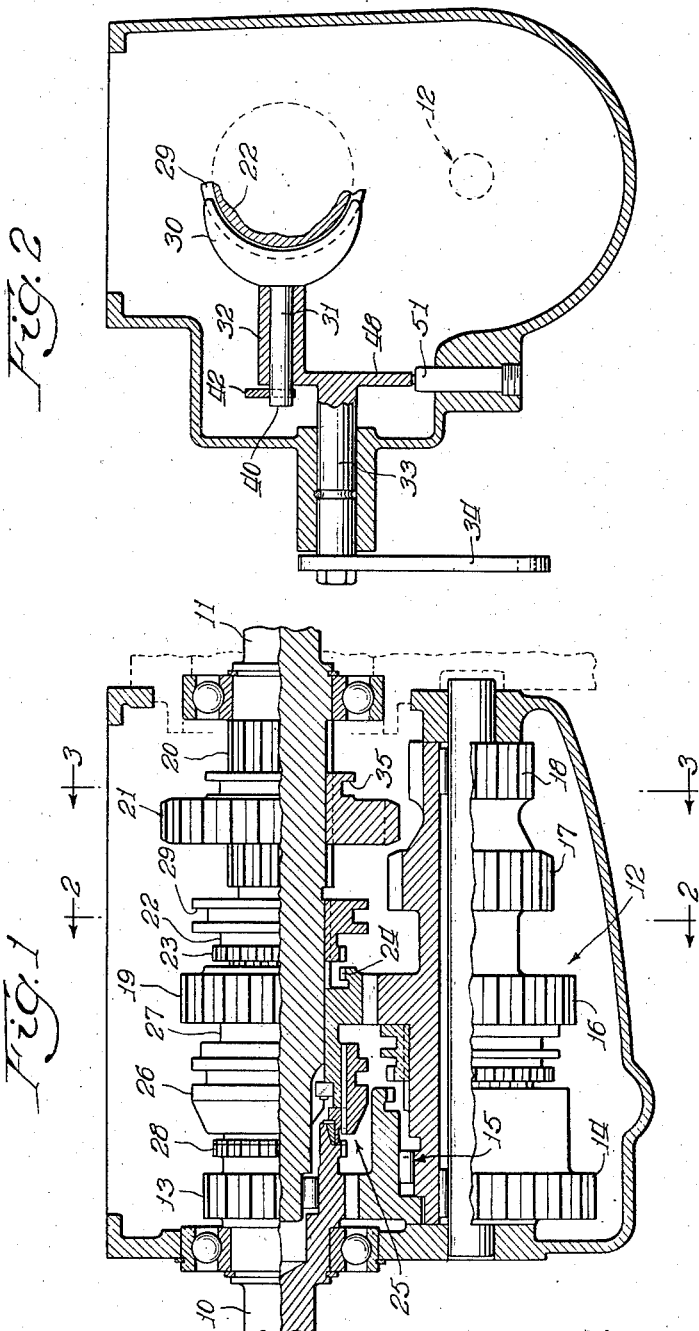
Inventor
Edward Swain Russey
By Edward C. Fitzhugh
Atty.

Jan. 2, 1945. E. S. RUSSEY 2,366,655
AUTOMATIC INTERLOCK
Filed July 19, 1941 2 Sheets-Sheet 2
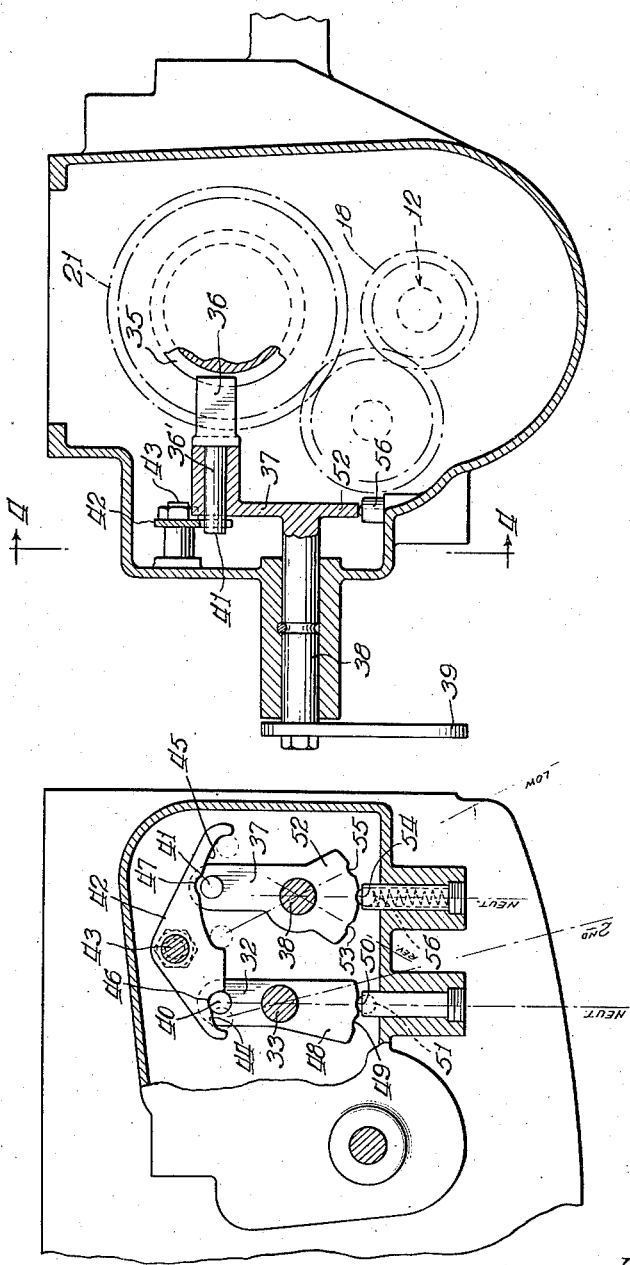
Inventor:
Edward Swain Russey
By Edward C. Fitzhugh
Atty.

Patented Jan. 2, 1945

2,366,655

UNITED STATES PATENT OFFICE 2,366,655

AUTOMATIC INTERLOCK

Edward Swain Russey, Muncie, Ind., assignor to Borg-Warner Corporation, Chicago, Ill., a corporation of Illinois Application July 19, 1941, Serial No. 403,199

6 Claims. (Cl. 74—477)

This invention relates to transmissions, and particularly to an interlock mechanism therefor.

The principal object of this invention is to provide an extremely simple interlock mechanism for a transmission which employs pivoted shifting elements instead of the usual slidable shift rails.

Another object of this invention is to provide an interlock mechanism which operates directly upon the pivoted shifting elements.

These and other objects and features of this invention will become apparent from the following description and accompanying drawings, in which:

Fig. 1 is a section in elevation of a transmission to which this invention may be applied;

Fig. 2 is a section through the transmission taken along line 2—2 of Fig. 1;

Fig. 3 is a section through the transmission taken along line 3—3 of Fig. 1; and Fig. 4 is a front elevation in section taken along lines 4—4 of Fig. 3 showing the interlock mechanism.

Referring now to the drawings for a detailed description of the invention, and particularly to Fig. 1, the transmission is comprised of an input shaft 10, an output shaft 11, and a countershaft indicated generally at 12. Rotatable with input shaft 10 is a gear 13 which meshes with a gear 14 mounted on countershaft 12 and adapted to drive said countershaft through an overrunning clutch 15. Rotatable with said countershaft 12 is a second speed gear 16, a first speed gear 17 and a reverse gear 18. Gears 16, 17 and 18 may be formed integrally with countershaft 12 as cluster gears. In constant mesh with second speed gear 16 is a gear 19 which is loosely mounted on output shaft 11. The right-hand end (Fig. 1) of output shaft 11 is formed with splines 20 on which is slidably mounted a gear 21. Said sliding gear 21 is adapted to be moved to the left to engage first speed gear 17, or to be moved to the position shown in Fig. 1 for neutral. Sliding gear 21 is also adapted to be moved to the right to engage an idler (not shown) which idler engages reverse gear 18 and provides a reverse drive in driven shaft 11.

Also slidably splined on driven shaft 11 is a collar 22 which is provided with external clutch teeth 23 engageable with internal clutch teeth 24 on gear 19 so as to comprise a positive jaw clutch connection between gear 19 and collar 22. A second jaw clutch 25 is provided which is comprised of a clutch sleeve 26 slidably splined to a hub 27 which may be integral with gear 19 so as to be rotatable therewith. Gear 13 on input shaft 10 is provided with external clutch teeth 28 which may be engaged by slidable sleeve 26 to provide a positive jaw clutch connection between input shaft 10 and gear 19.

The gear trains establishable through the transmission are as follows:

For reverse drive, gear 21 is moved to the right to engage the aforementioned reverse idler. Neutral and low speed forward are obtained by positioning sliding gear 21 in the position indicated and by engaging gear 21 with low speed gear 17 respectively. For all three of these conditions jaw clutch 25 and collar 22 must be moved to the right (Fig. 1) to disengage their respective clutch teeth. The gear train for reverse is from gear 13 to gear 14, overrunning clutch 15, countershaft 12, gear 18 and associated idler, and gear 21 to driven shaft 11. For low speed the train includes gears 13 and 14, overrunning clutch 15, countershaft 12 and gears 17 and 21. For second speed, gear 21 is in its neutral position and collar 22 is moved to the left so as to engage teeth 23 with teeth 24. The gear train is then from gear 13 to gear 14, overrunning clutch 15, countershaft 12, gear 16, gear 19, and collar 22 to driven shaft 11. For direct drive sliding gear 21 remains in neutral, collar 22 remains in its second speed position, and jaw clutch 25 is engaged so as to provide a direct connection between input shaft 10, gear 19, collar 22 to driven shaft 11.

Thus, it is apparent that sliding gear 21 and collar 22 are mutually exclusively operable and must be so operated to avoid damage to the transmission.

Referring now to Figs. 2 and 3 for details of the control mechanism for sliding gear 21 and collar 22, it will be observed that collar 22 is provided with a groove 29 in which is mounted a yoke 30. Said yoke 30 is secured to, or may be integral with, a shaft 31 which is mounted in a crank arm 32 of a rock shaft 33. Said rock shaft 33 is in turn adapted to be rotated by an external lever 34 which is connected to a suitable manual control (not shown). Similarly, sliding gear 21 is provided with an annular groove 35 in which rides a shift blade 36. Said blade 36 is secured to a shaft 36' which is mounted in a crank arm 37 of a rock shaft 38. An external lever 39 is secured to rock shaft 38, said lever 39 being likewise adapted to be connected to a manual control (not shown). It will be noted that the shafts for both yoke 30 and blade 36 extend through their respective crank arms 32 and 37 and form projecting pins 40 and 41 respectively.

Referring now to Fig. 4 for a detailed description of the interlock mechanism, it will be noted that pins 40 and 41 are bridged by a walking beam 42 which is pivoted to the casing at 43 as shown. Said walking beam 42 is formed with spaced notches 44 and 45 of arcuate form which receive pins 40 and 41, respectively. In each notch is a depression 46 and 47, respectively, which have a contour similar to that of the pin with which each is to cooperate. The notches 44 and 45 are in the form of segments of circles, the center of curvature of notch 44 lying on the axis of rock shaft 33 and the center of curvature of notch 45 lying on the axis of rotation of rock shaft 38. The radius of curvature is so chosen that when pin 40 is in depression 46, pin 41 is free to move along notch 45, and similarly, when pin 41 is in its depression 47 pin 40 is free to move along its notch 44. The location of the depressions with respect to the notches is such that either pin may be engaged by its respective depression when gear 21 and sliding collar 22 are in their neutral position. It is apparent, therefore, that the interlock operates in such a manner as to prevent movement of sliding gear 21 when the jaw clutch controlled by collar 22 is to be operated, and vice versa.

Opposite crank 32 is a plate 48 which has two notches 49 and 50 formed in the end thereof. A poppet 51 is adapted to engage notches 49 and 50 to locate crank 32 in the positions corresponding to the engaged (notch 49) and neutral (notch 50) positions of sliding collar 22. Similarly crank 37 is provided with a plate 52 which has notches 53, 54 and 55 formed in the end thereof. A poppet 56 is adapted to engage notches 53, 54 and 55 to locate crank 37 in positions corresponding to low, neutral and reverse positions respectively of sliding gear 21.

It is understood of course, that positive stops are provided for the pins 40 and 41 respectively by the ends of the notches as shown in dotted lines. This makes it unnecessary for poppets 51 and 56 to act as stops.

It is understood that the foregoing description is merely illustrative of a preferred embodiment of the invention and that the scope of the invention is not to be limited thereto but is to be determined by the appended claims.

I claim:

1. A transmission unit having shiftable elements, shafts for controlling the elements, said shafts being rotatable about substantially parallel axes, means rotatable with the shafts, each means having a projection, and a pivoted bar having recesses to be engaged by the projections and being movable about its pivot by rotation of a projection about its shaft while engaging a recess, said bar being so pivoted that when one recess is engaged the other is free, said bar having arcuate surfaces on one side of each recess adapted to be engaged by the free projection as it is rotated with its shaft, thereby serving to keep the other projection engaged with its recess.

2. A transmission unit as described in claim 1, the means rotatable with the shafts comprising plates having notches, and poppet means cooperating with the notches to position the shiftable elements.

3. A transmission unit as described in claim 1, the means rotatable with the shafts comprising plates having notches, and poppet means cooperating with the notches to position the shiftable elements, each of said projections comprising an extension of one of said shiftable elements.

4. A transmission unit having shiftable elements, shafts for controlling the elements, said shafts being rotatable about substantially parallel axes, means rotatable with the shafts, a pin carried by each of said means and movable therewith, and a pivoted bar movable by the pins and having recesses to receive the pins, said bar being so pivoted that when one pin is moved out of its recess the other pin is locked, thereby providing an interlock for the shiftable elements, and said recesses being formed in arcuate surfaces in the bar, each surface, when its recess is free of its corresponding pin, having a center coinciding with the center of rotation of the shaft rotatable with said pin.

5. A transmission unit having shiftable elements, shafts for controlling the elements, said shafts being rotatable about substantially parallel axes, means rotatable with the shafts, a pin carried by each of said means and movable therewith, and a pivoted bar having recesses to receive the pins, said bar being so pivoted that when one pin is moved out of its recess the other pin is locked, thereby providing an interlock for the shiftable elements, and poppet means cooperable with the rotatable means to hold the freely rotatable shafts in any one of a plurality of positions.

6. A transmission unit having shiftable elements, shafts for controlling the elements, said shafts being rotatable about substantially parallel axes, means rotatable with the shafts, a pin carried by each of said means and movable therewith, and a pivoted bar having recesses to receive the pins, said bar being so pivoted that when one pin is moved out of its recess the other pin is locked, thereby providing an interlock for the shiftable elements, poppet means cooperable with the rotatable means to hold the freely rotatable shafts in any one of a plurality of positions, and stop means for limiting the rotation of the shafts in either direction.

EDWARD SWAIN RUSSEY.